Sept. 21, 1971  A. WOERNER ET AL  3,606,732
ABSORPTION OF FORMALDEHYDE FROM GASES CONTAINING IT
Filed Nov. 4, 1968
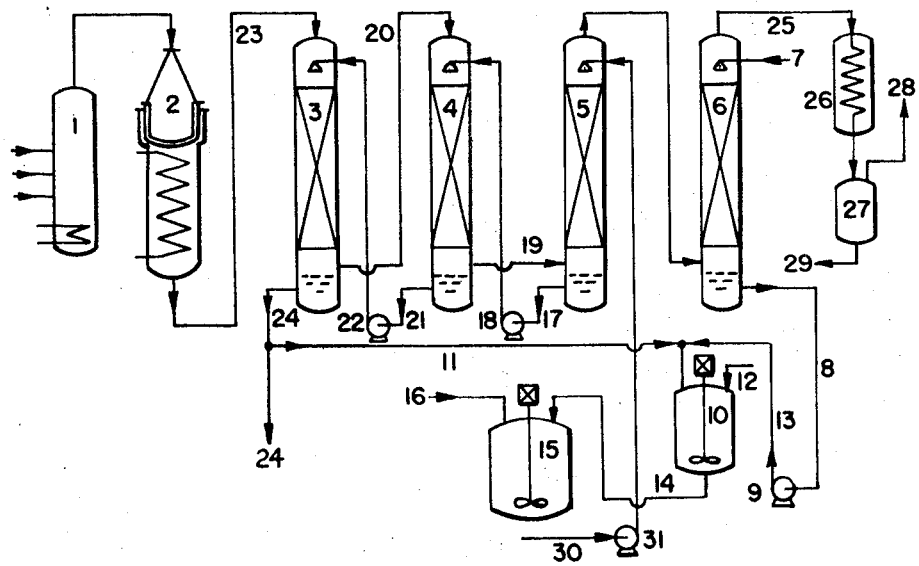
INVENTORS:
ALFRED WOERNER
GERD DUEMBGEN
HEINRICH SPERBER
HANS HAAS
OTTO GRABOWSKY
BY
Marzall, Johnston, Cook & Root
ATT'YS United States Patent Office 3,606,732
Patented Sept. 21, 1971

3,606,732
ABSORPTION OF FORMALDEHYDE FROM GASES CONTAINING IT
Alfred Woerner, Limburgerhof, Gerd Duembgen, Darmstadt, Heinrich Sperber and Hans Haas, Ludwigshafen, and Otto Grabowsky, Limburgerhof, Germany, assignors to Badische Anilin- & Soda-Fabrik Aktiengesellschaft, Ludwigshafen (Rhine), Germany
Filed Nov. 4, 1968, Ser. No. 773,190
Claims priority, application Germany, Nov. 4, 1967, P 16 43 689.8; Dec. 2, 1967, P 16 43 705.1
Int. Cl. B01d 53/16
U.S. Cl. 55—94        3 Claims

ABSTRACT OF THE DISCLOSURE

A process for the absorption of formaldehyde from gas containing formaldehyde (obtained in the dehydrogenating oxidation of methanol over silver catalysts) at elevated temperature in a plurality of stages, wherein the gas passes through at least three absorption stages at temperatures of from 60° to about 90° C., particularly from 70° to 85° C., and is contacted in each of the stages from the first stage to the penultimate stage with an aqueous solution of a urea-formaldehyde precondensate and in the final stage is contacted with an aqueous solution of urea.

---

The present invention relates to a process for the absorption of formaldehyde from gas containing formaldehyde which has been obtained by dehydrogenating oxidation of methanol over a silver catalyst, the process comprising a plurality of absorption stages.

It is known that formaldehyde can be absorbed from gas containing formaldehyde (for example gas obtained by synthesizing formaldehyde by oxidation and/or dehydrogenation of methyl alcohol) by using as the absorption liquid an aqueous solution of a urea-formaldehyde precondensate having a molar ratio of urea to formaldehyde of from 1:1.8 to 1:3 and maintaining a pH value of from 2.5 to 7 during the absorption. When using this method however it is not possible to remove formaldehyde completely.

It is also known from U.S. patent specification No. 3,151,960 that formaldehyde can be absorbed from gas containing formaldehyde using a plurality of urea solutions having different concentrations and solid urea, in three stages at temperatures at which water vapor is not condensed from the gas and water is not evaporated from the absorption liquids which are kept at a pH value of about 8. The oxygen content and the amount of inert gas in the reaction gas suggest that the gas originates from a process in which the formaldehyde is prepared from methanol using oxidic catalysts.

According to the present process gases containing formaldehyde are absorbed which have been obtained by dehydrogenating oxidation of methanol in contact with silver catalysts and which contain a larger amount of water vapor and a much smaller amount of inert gas than reaction gases obtained by using oxidic catalysts.

According to the process of U.S. patent specification No. 3,067,177, in which formaldehyde is recovered by absorption in urea solutions in the alkaline range with the formation of methylolurea, the synthesis gas from dehydrogenating oxidation of methanol in contact with silver catalysts cannot be absorbed in an economical manner because the formaldehyde solution obtained is not sufficiently concentrated; this is because at the low temperature used, the partial pressure of the water vapor is so low that too much water is condensed out with the solution. On the other hand it is not possible to use the higher temperatures necessary for removal of water vapor in the process of the U.S. patent specification because at a pH value of 7 to 9 precipitation occurs at elevated temperatures.

It is our object of the present invention to provide an improved process for absorbing formaldehyde from gas containing formaldehyde which has been obtained by dehydrogenating oxidation of methanol in contact with a silver catalyst, in which all the formaldehyde is recovered from the synthesis gas. Another object of the invention is to provide a process in which the formaldehyde solution obtained as end product has only a low content of methyl alcohol.

In accordance with this invention these and other objects and advantages are achieved in an improved process for absorbing formaldehyde from gas containing formaldehyde which has been obtained by dehydrogenating oxidation of methanol in contact with silver catalysts at elevated temperature by multistage absorption, the improvement consisting in passing the gas successively through at least three absorption stages at temperatures of from 60° to about 90° C., particularly from 70° to 85° C., and contacting the gas with an aqueous solution of a urea-formaldehyde precondensate in each of the stages from the first stage to the penultimate stage and with an aqueous solution of urea in the final stage.

According to the new process it is possible to recover all the formaldehyde from the synthesis gas. As compared with prior processes, the yield of formaldehyde is 3 to 5% higher. The offgas leaving the final absorption stage contains the major part of the unreacted methyl alcohol. After this has been condensed, it is returned to the reaction as an aqueous product without purification. Another advantage of the process according to this invention is that the formaldehyde solution obtained as end product has only a low content of methyl alcohol.

The new process is advantageously carried out continuously. It is preferred to use a total of four or at most five successive absorption stages.

In the final stage it is preferred to use as the absorption liquid a 50 to 80%, particularly a 60 to 70%, by weight aqueous solution of urea of which advantageously 20 to 80%, preferably 30 to 60%, by weight, calculated as urea, is used with reference to the methanol used for the reaction. The solution, which is advantageously enriched with formaldehyde to such an extent that the aqueous formaldehyde urea solution withdrawn contains formaldehyde and urea in the molar ratio 0.05:1 to 0.4:1, advantageously 0.1:1 to 0.2:1, absorbs from the already impoverished gas the remainder of the formaldehyde. The residence time of the absorption liquid in the final stage should not exceed one hour and preferably should not exceed half an hour.

In the first to penultimate stages of absorption, an aqueous solution of a urea-formaldehyde precondensate is used as absorption liquid which has been prepared by a conventional method from an aqueous urea-formaldehyde solution having a molar ratio of formaldehyde to urea of at least 1.8 to about 2.8, preferably 2 to 2.4, by condensation in the acid range, for example with an addition of formic acid, at a pH value of preferably from about 4 to 6.5, particularly from 5 to 6, and at a temperature of from 60° to 95° C., preferably from 80° to 95° C. The condensation is advantageously carried to such an extent that about 15 to 40% by weight of the formaldehyde urea precondensates are thus obtained of methylene bridging groups. A pH value of about 6 to 7, preferably about 6.5 to 7, is then set up in the solutions by substantial neutralization, for example by adding caustic soda solution. Clear stable solutions of formaldehyde urea precondensates are thus obtained from which no solid substances separate out even after prolonged storage.

The aqueous solution of precondensate obtained is advantageously allowed to flow through the absorption stages preceding the final stage in the opposite sequence to that in which the gas flows through.

When for example there are four absorption stages in all, about 2 to 8% by weight of the total amount of formaldehyde is absorbed by the aqueous solution of urea-formaldehyde precondensate in the third stage, about 8 to 15% by weight in the second stage and about 70 to 90% by weight in the first stage. From 1 to 5% by weight of the amount of formaldehyde is generally absorbed in the fourth stage. The molar ration of formaldehyde (free and condensed) to urea in the solutions withdrawn from the individual absorption stages is as a rule from about 0.1 to 0.4 in the fourth stage, usually from about 2 to 2.8 in the third stage, generally does not exceed 3 in the second stage and in general has a value of 3.5 to 6 in the first stage. The water content of the solution withdrawn from the first stage is usually from 25 to 45% by weight.

Whereas reaction gas and absorption liquid are passed cocurrent through the first absorption stage, the absorption in the other stages may be carried out cocurrent or countercurrent.

The absorption temperatures in the individual stages may be from 60° to 90° C., preferably from 75° to 85° C.

The solutions withdrawn from the first to penultimate stages have in general pH values of from 4 to 7, the pH value decreasing from the penultimate to the first stage. The formaldehyde-urea solution withdrawn from the final absorption stage is almost neutral.

A preferred embodiment of the process according to the invention consists in using the aqueous formaldehyde-urea solution obtained from the final absorption stage for the production of the aqueous solution of formaldehyde-urea precondensate. This is advantageously done by mixing the solution obtained from the final stage with such an amount of concentrated formaldehyde solution withdrawn from the first absorption stage that the mixture, as described above, contains 1.8 to about 2.8, preferably 2 to 2.4, moles of formaldehyde, per mole of urea. It is important that the mixing process should be completed within a very short time, for example within one to five seconds, in order to avoid separation of solid condensates. The mixture is then condensed in the manner described, neutralized and finally used in the absorption stages preceding the final stage as absorption liquid.

Unreacted methanol is advantageously separated by condensation in a cooler from the offgas leaving the final absorption stage. The aqueous methanol thus obtained can be returned immediately to the reaction. For example by cooling the reaction gas to 25° C., a 1 to 4% by weight aqueous solution of methanol may be obtained and by reusing this the yield of formaldehyde may be raised by from 1 to 2.5%.

The invention is illustrated by the following example. The parts given in the example are by weight. They bear the same relation to parts by volume as the kilogram to the cubic meter.

EXAMPLE

This example is given with references to the drawing which shows diagrammatically an apparatus suitable for carrying out the process according to this invention.

120.8 parts of methanol and 74 parts of water are vaporized in an evaporator 1 per hour and passed together with 162 parts by volume of air into a reactor 2 and over a silver catalyst by a conventional method. The gas escaping per hour from the reactor 2 consists of 100 parts of formaldehyde, 124 parts of water, 3.7 parts of methanol and 167 parts by volume of inert gas. 50 parts per hour of urea in the form of a 60% by weight aqueous urea solution is supplied through line 7 to the final absorption column 6. The solution is passed countercurrent to the reaction gas at a temperature of 80° C. The residence time of the solution in the column is about ten to fifteen minutes. A solution containing 0.2 mole of formaldehyde per mole of urea is withdrawn from the bottom of the column 6.

The solution is supplied through line 8 and pump 9 to a mixing zone 13 where it meets 325 parts of solution withdrawn from the first absorption column 3 through line 11, the components becoming mixed in less than one minute. The molar ratio of urea to formaldehyde in the mixture obtained is 1:2.35. The mixture passes into the condensation vessel 10 to which formic acid is added through line 12 in such an amount that a pH value of 5 is set up. The temperature in the vessel 10 is kept at 90° C. After a residence time of about thirty minutes, the condensation product passes through line 14 into a vessel 15 in which a pH value of 6 is set up by adding caustic soda through line 16 and the solution is cooled to 55° C. By means of line 30 and pump 31, this solution is fed to the top of the third absorption column 5 and passed at 73° C. countercurrent to the gas introduced through line 19. The molar ratio of urea to formaldehyde in the solution withdrawn from the bottom of column 5 is 1:2.4. Solution fed through line 17 and pump 18 to the top of the second absorption column 4 is passed cocurrent with the gas supplied also to the top of the column 4 through line 20. At an absorption temperature of 75° C., the pH value in the solution withdrawn from the bottom of column 4 is 5.8 and the molar ratio of urea to formaldehyde is 1:2.6. The solution is fed through line 21 and pump 22 to the top of the first absorption column 3 and passed cocurrent at an absorption temperature of 75° C. with the reaction gas supplied through line 23 from the reactor 2. The molar ratio of urea to formaldehyde in the solution withdrawn from the bottom of the column 3 through line 24 is 1:4 and the pH value is 5 to 6. 325 parts per hour of the solution is branched off through line 11. The hourly amount of solution withdrawn consists of 100 parts of formaldehyde, 50 parts of urea, 98.2 parts of water and 1.8 parts methanol.

80 parts of formaldehyde is absorbed in the column 3, 13 parts in the column 4, 2 parts in the column 5 and 5 parts in the column 6.

The gas from column 6 is passed through line 25 and a cooler 26 and finally escapes through a separator 27 and line 28. 64 parts per hour of a 2.8% by weight aqueous methanol is obtained in the separator 27 and this contains less than 0.07% by weight of formaldehyde. Formaldehyde cannot be detected in the gas escaping through line 28. The methanol solution is returned through line 29 to the evaporator 1. The actual methanol consumption is thus only 119 parts per hour for each 100 parts per hour of formaldehyde, i.e. the yield is 89.5% of the theory. The formaldehyde contained in the returned methanol solution is also not lost in this method.

We claim:
1. A process for the production of formaldehyde solutions by reaction of methanol in the gas phase with oxygen or a gas containing free oxygen in the presence or absence of steam over silver catalysts and absorption of essentially all of the formaldehyde from the resultant reaction gas by multistage absorption using urea-formaldehyde precondensates at elevated temperature, said reaction gas being passed successively through at least three absorption stages at temperatures of 60 to 95° C., the first stage through the penultimate stage involving contacting of the gas with an aqueous solution of a urea-formaldehyde precondensate prepared from an aqueous urea-formaldehyde solution with a molar ratio of formaldehyde to urea of from 1.8 to 2.8 by condensation at a pH of about 4 to 6.5 and a temperature of from 60 to 95°

C. followed by neutralization to pH 6 to 7, and the last stage involving contacting of the gas with an aqueous urea solution.

2. The process as claimed in claim 1, wherein the temperature in said absorption stages is from 70 to 85° C.

3. A process as claimed in claim 1, wherein said aqueous solution of urea-formaldehyde precondensate is obtained by said condensation at a pH of from 5 to 6.

References Cited

UNITED STATES PATENTS

| | | | |
|---|---|---|---|
| 3,067,177 | 12/1962 | Greco et al. | 55—93X |
| 3,151,960 | 10/1964 | Rooij | 55—94 |

REUBEN FRIEDMAN, Primary Examiner

R. W. BURKS, Assistant Examiner

PO-1050
(5/69)

UNITED STATES PATENT OFFICE
CERTIFICATE OF CORRECTION

Patent No. 3,606,732          Dated September 21, 1971

Inventor(s) Alfred Woerner et al

It is certified that error appears in the above-identified patent and that said Letters Patent are hereby corrected as shown below:

Column 3, line 1, "urea precondensates are thus obtained" should read -- in the solutions is combined in the form --.

Signed and sealed this 21st day of March 1972.

(SEAL)
Attest:

EDWARD M. FLETCHER, JR.          ROBERT GOTTSCHALK
Attesting Officer          Commissioner of Patents